(12) United States Patent
Lee et al.

(10) Patent No.: US 9,798,110 B2
(45) Date of Patent: Oct. 24, 2017

(54) PHOTOGRAPHIC LENS AND PHOTOGRAPHIC APPARATUS INCLUDING THE SAME

(71) Applicant: KOLEN CO., LTD., Gyeonggi-do (KR)

(72) Inventors: Jong Jin Lee, Seoul (KR); Chan Goo Kang, Gyeonggi-do (KR)

(73) Assignee: KOLEN CO., LTD. (KR)

(*) Notice: Subject to any disclaimer, the term of this patent is extended or adjusted under 35 U.S.C. 154(b) by 0 days.

(21) Appl. No.: 15/054,067

(22) Filed: Feb. 25, 2016

(65) Prior Publication Data

US 2016/0252710 A1    Sep. 1, 2016

(30) Foreign Application Priority Data

Feb. 27, 2015  (KR) .................. 10-2015-0028196

(51) Int. Cl.
| | | |
|---|---|---|
| *G02B 9/60* | (2006.01) | |
| *G02B 13/18* | (2006.01) | |
| *G02B 3/02* | (2006.01) | |
| *G02B 13/00* | (2006.01) | |
| *G02B 27/00* | (2006.01) | |

(52) U.S. Cl.
CPC ..... *G02B 13/0045* (2013.01); *G02B 27/0025* (2013.01); *G02B 9/60* (2013.01)

(58) Field of Classification Search
CPC ........ G02B 13/0045; G02B 9/60; G02B 13/04
USPC ................................ 359/714, 753, 763, 764
See application file for complete search history.

(56) References Cited

U.S. PATENT DOCUMENTS

| | | | |
|---|---|---|---|
| 9,651,757 B2* | 5/2017 | Liao ................... | G02B 13/0045 |
| 2013/0050847 A1 | 2/2013 | Hsu et al. | |
| 2013/0188263 A1 | 7/2013 | Tsai et al. | |
| 2015/0177489 A1* | 6/2015 | Hashimoto ........ | G02B 13/0045 |
| | | | 359/713 |
| 2016/0252708 A1* | 9/2016 | Chung ................... | G02B 9/60 |

* cited by examiner

*Primary Examiner* — William Choi
(74) *Attorney, Agent, or Firm* — Fitch Even Tabin & Flannery LLP

(57) ABSTRACT

A photographic lens includes, in a sequence from an object to an image plane, a first lens having positive refractive power; a second lens having negative refractive power; a third lens having positive refractive power; a fourth lens having positive refractive power; and a fifth lens having negative refractive power, where the photographic lens satisfies the following condition:

$$75°<FOV<85°$$

where FOV is a field of view of the photographic lens.

10 Claims, 6 Drawing Sheets

PHOTOGRAPHIC LENS AND PHOTOGRAPHIC APPARATUS INCLUDING THE SAME

CROSS-REFERENCE TO RELATED APPLICATIONS

This application claims the benefit of Korean Patent Application No. 10-2015-0028196, filed on Feb. 27, 2015, in the Korean Intellectual Property Office, the disclosure of which is incorporated herein in its entirety by reference.

BACKGROUND

1. Field

One or more exemplary embodiments relate to photographic lenses, and more particularly, to a compact photographic lens having a high optical performance that is designed to be suitable for mobile phone cameras.

2. Description of the Related Art

Recently, the use of cameras including solid-state imaging devices such as charge coupled devices (CCDs) or complementary metal oxide semiconductor (CMOS) image sensors has been rapidly increasing.

The pixel integration density of solid-state imaging devices has increased to improve the resolution of cameras. Along with this, small and lightweight cameras have been developed by improving the performance of photographic lenses included in the cameras. Photographing apparatuses using solid-state imaging devices are suitable for miniaturization, and thus have recently been applied to mobile apparatuses such as smartphones.

In general, many lenses are used to secure an optical performance. However, the use of many lenses adversely affects miniaturization, weight lightening, and price competitiveness of cameras. When a small number of lenses are used, miniaturization and price competitiveness of cameras improve, but aberration correction may not be enough.

Moreover, as the professionalism of consumers for cameras has recently continuously increased, a design that accomplishes an optical performance suitable for purposes together with miniaturization has been requested. Thus, there is a demand for photographic lenses designed to accomplish miniaturization, weight lightening, and cost reduction while obtaining a desired performance.

SUMMARY

One or more exemplary embodiments include a photographic lens that is favorable for miniaturization/weight lightening and has good performance.

Additional aspects will be set forth in part in the description which follows and, in part, will be apparent from the description, or may be learned by practice of the presented embodiments.

According to an aspect of the present invention, a photographic lens includes, in a sequence from an object to an image plane, a first lens having positive refractive power; a second lens having negative refractive power; a third lens having positive refractive power; a fourth lens having positive refractive power; and a fifth lens having negative refractive power, where the photographic lens satisfies the following condition:

$75° < FOV < 85°$ where FOV is a field of view of the photographic lens.
The photographic lens may further satisfy the following condition:

$1.0 < TTL/imgH < 2.0$ where TTL is a distance on an optical axis from an entrance surface of the first lens to the image plane, and imgH is an image height.

The photographic lens may further satisfy the following condition:

$0.2 < BFL/f < 0.5$ where BFL is a distance on an optical axis from an exit surface of the fifth lens to the image plane, and f is a focal length of the photographic lens.

The photographic lens may satisfy the following condition:

$1.6 < (Ind2+Ind3)/2 < 1.7$ where Ind2 is a refractive index of the second lens and Ind3 is a refractive index of the third lens.

An entrance surface of the first lens may be convex toward the object.

An exit surface of the second lens may be concave toward the image plane.

The third lens may have a meniscus shape.

An exit surface of the fourth lens may be convex toward the image plane.

An exit surface of the fifth lens may be an aspherical surface having at least one inflection point.

All of the first lens through the fifth lens may be aspherical plastic lenses.

According to an aspect of the present invention, a photographic lens includes, in a sequence from an object to an image plane, a first lens having positive refractive power; a second lens having negative refractive power; a third lens having positive refractive power; a fourth lens having positive refractive power; and a fifth lens having negative refractive power, wherein the photographic lens satisfies the following condition:

$70° < FOV < 90°$ $0.2 < BFL/f < 0.5$ where FOV is a field of view of the photographic lens, BFL is a distance on an optical axis from an exit surface of the fifth lens to the image plane, and f is a focal length of the photographic lens.

The photographic lens may satisfy the following condition:

$1.6 < Ind2 < 1.7$ $1.6 < Ind3 < 1.7$ where Ind2 is a refractive index of the second lens and Ind3 is a refractive index of the third lens.

According to an aspect of the present invention, a photographic apparatus includes the above-described photographic lens; and an image sensor configured to convert an optical image formed by the photographic lens into an electrical signal.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
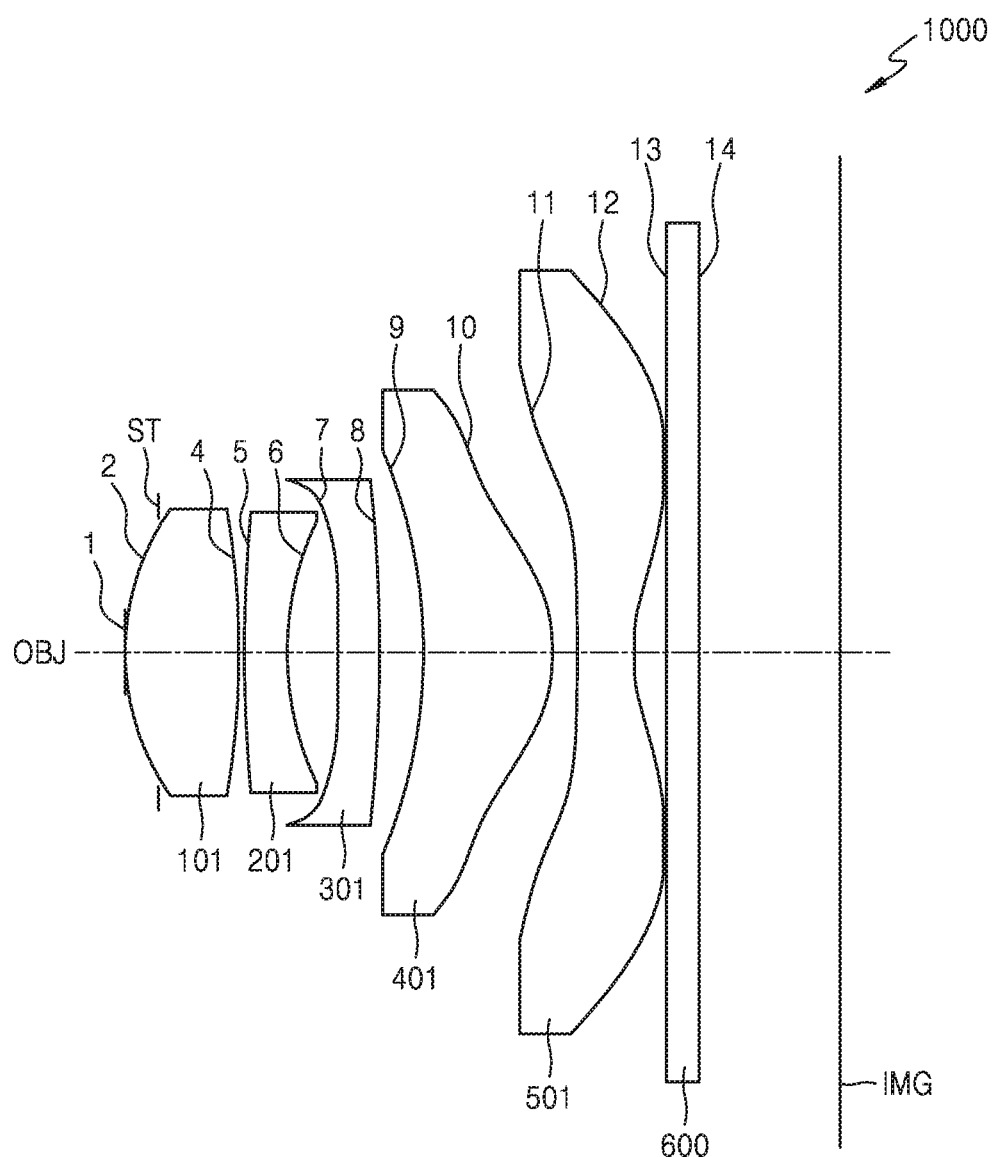
FIG. 1 is a cross-sectional view illustrating an optical arrangement of a photographic lens according to an embodiment.

Exemplary embodiments of the present invention will now be described more fully with reference to the accompanying drawings. Like reference numerals in the drawings denote like elements, and sizes of components in the drawings may be exaggerated for clarity and convenience of explanation.

FIG. 1 illustrates an optical arrangement of a photographic lens 1000 according to Embodiment 1.

Referring to FIG. 1, the photographic lens 1000 includes a first lens 101 having positive refractive power, a second lens 201 having negative refractive power, a third lens 301 having positive refractive power, a fourth lens 401 having positive refractive power, and a fifth lens 501 having negative refractive power, which are sequentially arranged in a direction from an object OBJ to an image plane IMG.

An image sensor (not shown), such as a charge coupled device (CCD) or a complementary metal-oxide semiconductor (CMOS), is disposed on the image plane IMG.

The lenses that constitute the photographic lens 1000 achieve miniaturization, weight lightening, and a wide angle, and are shaped such that they may achieve smooth aberration correction. Hereinafter, an object side surface of each lens is referred to as an entrance surface, and an image side surface thereof is referred to as an exit surface.

The photographic lens 1000 may satisfy the following conditions:

$$70°<FOV<90° \quad (1)$$

where FOV is a field of view of the photographic lens 1000.

According to Condition (1), a wide angle of view is accomplished.

Condition (1) may be modified into Condition (1-1), and Condition (1-1) may be used.

$$75°<FOV<85° \quad (1-1)$$

The photographic lens 1000 may satisfy the following conditions:

$$1.0<TTL/imgH<2.0 \quad (2)$$

where FOV is a field of view of the photographic lens 1000, TTL is an overall length of the photographic lens 1000, namely, a distance on an optical axis from an entrance surface of the first lens 101 to the image plane IMG, and imgH is an image height. The image height is a length from a center of the image plane IMG in a diagonal direction, namely, a half of a diagonal length of an effective pixel region of an image sensor.

Condition (2) defines a ratio of the overall length to the effective pixel region. According to Condition (2), a compact optical system having a short overall length is accomplished. When the ratio deviates from a lower limit of Condition (2), the overall length decreases, but aberration correction is difficult. When the ratio deviates from an upper limit of Condition (2), aberration correction is easy, but the overall length increases. This impedes miniaturization of optical systems.

Condition (2) may be modified into Condition (2-1), and Condition (2-1) may be used.

$$1.3<TTL/imgH<1.5 \quad (2-1)$$

The photographic lens 1000 may satisfy the following conditions:

$$0.2<BFL/f<0.5 \quad (3)$$

where BFL is a back focal length, namely, a distance on the optical axis from an exit surface of the fifth lens 501 to the image plane IMG, and f is a focal length of the photographic lens 1000.

Condition (3) defines a ratio of the back focal length to the focal length. When the ratio satisfies Condition (3), optical systems having an optical performance may be easily manufactured. When the ratio deviates from a lower limit of Condition (3), the back focal length is small and is thus favorable to secure an optical performance, but it is difficult to perform an assembly process. When the ratio deviates from an upper limit of Condition (3), an assembly process is easily performed, but securing an optical performance is difficult.

Condition (3) may be modified into Condition (3-1), and Condition (3-1) may be used.

$$0.3<BFL/f<0.4 \quad (3-1)$$

The photographic lens 1000 may satisfy the following conditions:

$$1.6<(Ind2+Ind3)/2<1.7 \quad (4)$$

where Ind2 is a refractive index of the second lens 201 and Ind3 is a refractive index of the third lens 301.

Condition (4) defines the refractive indices of the second and third lenses 201 and 301, and each of the refractive indices has a numeric range that facilitates forming of each of the second and third lenses 201 and 301 using a low-priced plastic material.

Condition (4) may be modified into Conditions (4-1) and (4-2), and Conditions (4-1) and (4-2) may be used.

$$1.6<Ind2<1.7 \quad (4-1)$$

$$1.6<Ind3<1.7 \quad (4-2)$$

In other words, each of the refractive indices of the second and third lenses 201 and 301 may satisfy Condition (4). In general, a glass material has a larger refractive index than a plastic material, but is heavier and more costly than the plastic material. A lens shaping condition of the glass material is stricter than that of the plastic material. By obtaining desired refractive power by using a material that satisfies Condition (4), weight lightening, manufacture easiness, and cost reduction may be achieved.

A detailed shape of each lens included in the photographic lens 1000 will now be described in detail.

The first lens 101 has positive refractive power, and may have a shape in which an entrance surface is convex toward the object OBJ.

The second lens 201 has negative refractive power, and may have a shape in which an exit surface is concave toward the image plane IMG.

The third lens 301 has positive refractive power, and may have a meniscus shape, for example, a meniscus shape that is convex toward the image plane IMG.

The first lens 401 has positive refractive power, and may have a shape in which an exit surface is convex toward the image plane IMG. The fourth lens 401 may have, for example, a meniscus shape that is convex toward the image plane IMG.

The fifth lens 501 has negative refractive power, and may have an aspherical shape in which an exit surface has at least one inflection point.

A stop ST may be disposed on the side of an entrance surface of the first lens 101, but the location of the stop ST is not limited thereto.

An infrared ray block filter 600 may be disposed between the fifth lens 501 and the image plane IMG. However, embodiments are not limited thereto, and the infrared ray blocking filter 600 may be omitted. Alternatively, both or one of the infrared ray blocking filter 600 and a cover glass may be disposed.

The first lens 101 through the fifth lens 501 may be formed of a glass material or a plastic material. However, at least one of the first through fifth lenses 101 through 501 may be formed of a plastic material to achieve weight lightening. To achieve aberration correction, at least one of the first through fifth lenses 101 through 501 may employ an aspherical surface as at least one surface. In this case, the at least one lens employing an aspherical surface may be formed of a plastic material to achieve process easiness. All of the first through fifth lenses 101 through 501 may be implemented as aspherical plastic lenses in order to achieve aberration correction, weight lightening, and cost reduction.

Lens data according to several embodiments of the present invention will now be described in detail. In the lens data, ST indicates a stop, and an indication * behind a surface numeral indicates that a corresponding surface is aspherical. In the lens data, R, T, Nd, and Vd indicate the radius of curvature, a thickness or interval, a refractive index, and an Abbe's number, respectively. In the lens data, Fno. indicates the number of F, and f indicates a focal length. The units of the focal length, the radius of curvature, and the thickness or interval are each mm.

The aspherical surface is defined as follows.

[Equation 1]
$$Z = \frac{Y^2}{R(1 + \sqrt{1 - (1+K)Y^2/R^2})} + AY^4 + BY^6 + CY^8 + DY^{10}$$

where Z denotes a distance from a vertex of a lens along an opitcal axis, Y denotes a distance from the vertex of the lens in a direction perpendicular to the optical axis, K denotes a conic constant, A, B, C, and D denote aspherical coefficients, and R denotes the radius of curvature of the vertex of the lens.

<Embodiment 1>

FIG. 1 illustrates an optical arrangement of the photographic lens 1000 according to Embodiment 1, and lens data according to Embodiment 1 is as follows.

TABLE 1

| FNo. = 2.29/f = 2.0587 mm | | | | |
|---|---|---|---|---|
| Surface | R | T | Nd | Vd |
| 1 | Infinity | 0.2 | | |
| ST | Infinity | −0.2 | | |
| 3* | 1.4564 | 0.692 | 1.546 | 56.093 |
| 4* | −10.8117 | 0.05 | | |
| 5* | 19.7351 | 0.25 | 1.645 | 23.518 |
| 6* | 2.261 | 0.3113 | | |
| 7* | 21.8084 | 0.2575 | 1.645 | 23.518 |
| 8* | 50.5462 | 0.2825 | | |

TABLE 1-continued

| FNo. = 2.29/f = 2.0587 mm | | | | |
|---|---|---|---|---|
| Surface | R | T | Nd | Vd |
| 9* | −2.794 | 0.791 | 1.546 | 56.093 |
| 10* | −0.8062 | 0.1557 | | |
| 11* | −10.2271 | 0.35 | 1.546 | 56.093 |
| 12* | 0.9792 | 0.2 | | |
| 13 | Infinity | 0.21 | | |
| 14 | Infinity | 0.87 | | |
| IMG | Infinity | 0 | | |

Table 2 below shows an aspherical coefficient.

TABLE 2

| Surface | K | A | B | C | D |
|---|---|---|---|---|---|
| 3 | −0.2039 | −0.0082 | 0.0563 | −0.3696 | 1.072 |
| 4 | 0 | −0.0458 | 0.3216 | −1.2289 | 2.015 |
| 5 | 0 | −0.0614 | 0.5346 | −1.5502 | 2.3777 |
| 6 | 2.9353 | −0.0868 | 0.3843 | −0.8119 | 1.2546 |
| 7 | 0 | −0.2262 | 0.1718 | −0.5433 | 1.7087 |
| 8 | 0 | −0.1687 | 0.1866 | −0.5564 | 1.3161 |
| 9 | −8.0758 | −0.0519 | 0.1285 | −0.3981 | 0.6533 |
| 10 | −4.3635 | −0.1394 | 0.2634 | −0.3975 | 0.3782 |
| 11 | 0 | −0.0287 | −0.0763 | 0.0627 | −0.0164 |
| 12 | −8.4837 | −0.1023 | 0.04 | −0.0129 | 0.0009 |

Figure 2:
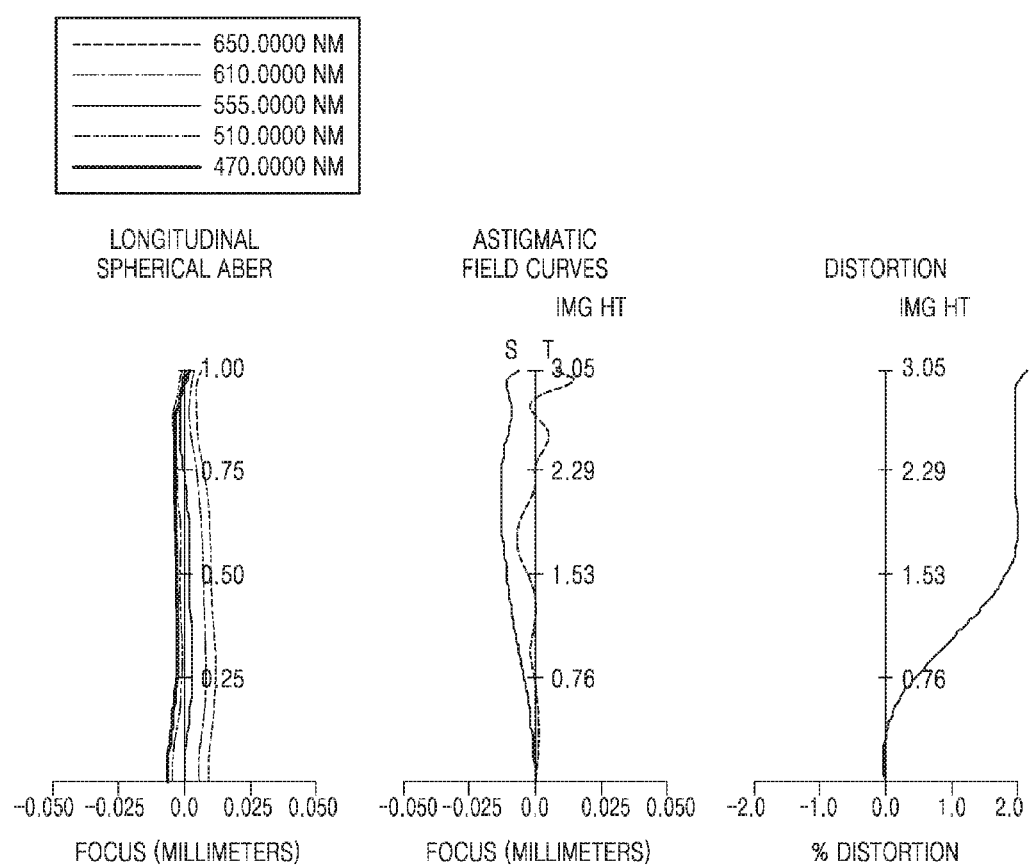
FIG. 2 illustrates a longitudinal spherical aberration, astigmatic field curves, and distortion of the photographic lens according to the embodiment of FIG. 1.

FIG. 2 illustrates a longitudinal spherical aberration, astigmatic field curves, and distortion of a photographic lens optical system according to Embodiment 1. Longitudinal spherical aberrations are shown for light beams having wavelengths of 650 (nm), 610 (nm), 555 (nm), 510 (nm), and 470 (nm), respectively, and astigmatic field curves and distortion are shown for the light beam having a wavelength of 555 (nm). In an astigmatic field curve graph, a sagittal field curvature and a tangential field curvature are indicated by S and T, respectively.

<Embodiment 2>

Figure 3:
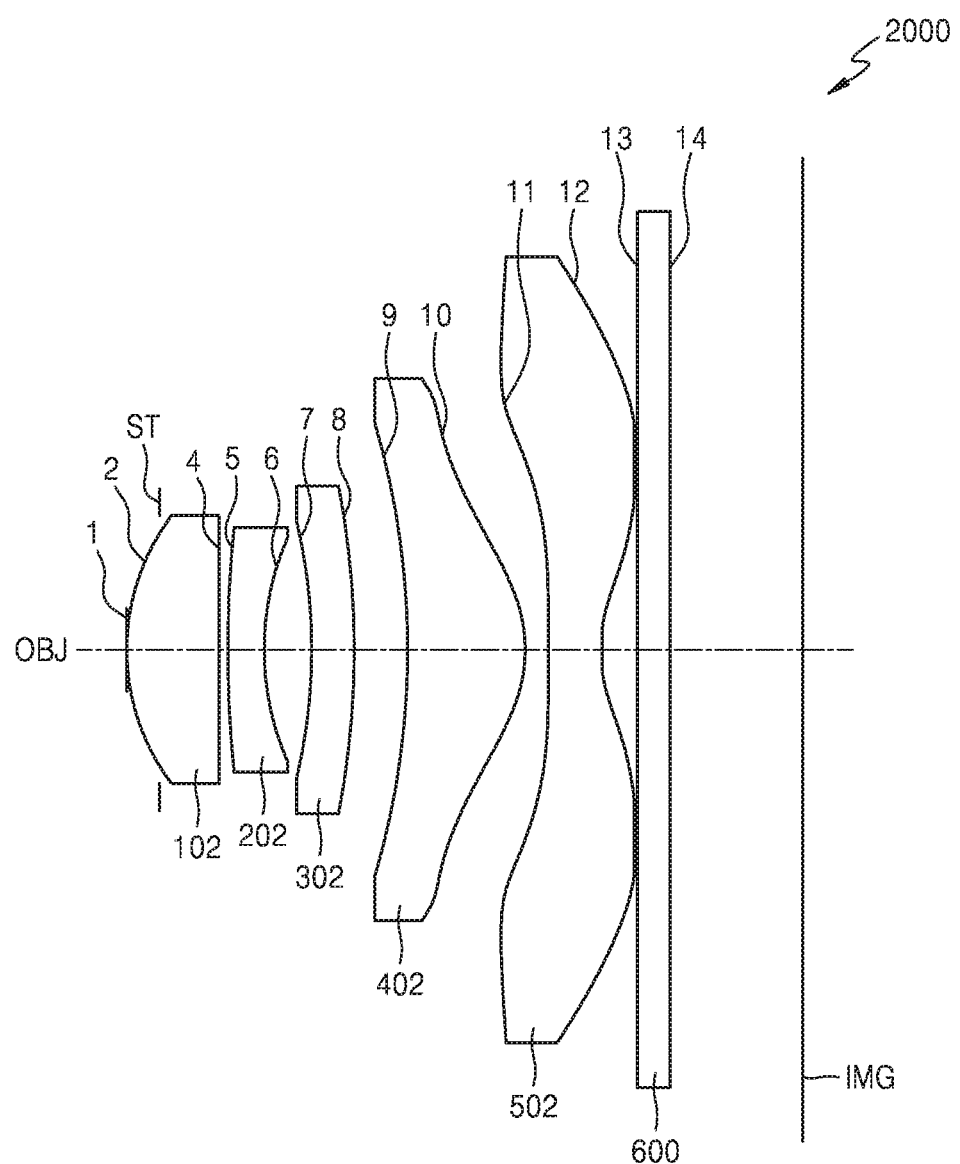
FIG. 3 is a cross-sectional view illustrating an optical arrangement of a photographic lens according to another embodiment.

FIG. 3 illustrates an optical arrangement of a photographic lens 2000 according to Embodiment 2.

Referring to FIG. 3, the photographic lens 2000 includes a first lens 102 having positive refractive power, a second lens 202 having negative refractive power, a third lens 302 having positive refractive power, a fourth lens 402 having positive refractive power, and a fifth lens 502 having negative refractive power, which are sequentially arranged in a direction from the object OBJ to the image plane IMG.

Lens data according to Embodiment 2 is as follows.

TABLE 3

| FNo. = 2.09/f = 1.3985 mm | | | | |
|---|---|---|---|---|
| Surface | R | T | Nd | Vd |
| 1 | Infinity | 0.2 | | |
| ST | Infinity | −0.2 | | |
| 3* | 1.3283 | 0.5752 | 1.546 | 56.093 |
| 4* | 189.106 | 0.0441 | | |
| 5* | 11.3802 | 0.23 | 1.656 | 21.465 |
| 6* | 2.2696 | 0.2876 | | |
| 7* | −100 | 0.2705 | 1.656 | 21.465 |
| 8* | −39.6464 | 0.3283 | | |
| 9* | −3.3069 | 0.7201 | 1.546 | 56.093 |
| 10* | −0.7903 | 0.1542 | | |
| 11* | −26.188 | 0.33 | 1.546 | 56.093 |
| 12* | 0.8859 | 0.22 | | |
| 13 | Infinity | 0.21 | | |
| 14 | Infinity | 0.7981 | | |
| IMG | Infinity | 0.0019 | | |

Table 4 below shows an aspherical coefficient.

TABLE 4

| Surface | K | A | B | C | D |
|---|---|---|---|---|---|
| 3 | −0.1592 | −0.0154 | 0.2495 | −1.7092 | 6.4441 |
| 4 | 0 | −0.0988 | 0.4052 | −0.6025 | −1.7643 |
| 5 | 0 | −0.1149 | 0.6015 | 0.4811 | −14.6129 |
| 6 | 4.2159 | −0.069 | 0.2188 | 0.9226 | −7.4488 |
| 7 | 0 | −0.1762 | −0.2475 | 2.2472 | −14.7248 |
| 8 | 0 | −0.0896 | −0.2148 | 1.1579 | −4.7494 |
| 9 | −16.9644 | −0.0161 | 0.1256 | −0.5836 | 1.2702 |
| 10 | −4.0158 | −0.0753 | 0.152 | −0.3203 | 0.4183 |
| 11 | 0 | −0.0847 | −0.0438 | 0.0621 | −0.0203 |
| 12 | −6.9413 | −0.1582 | 0.1282 | −0.0937 | 0.0487 |

Figure 4:
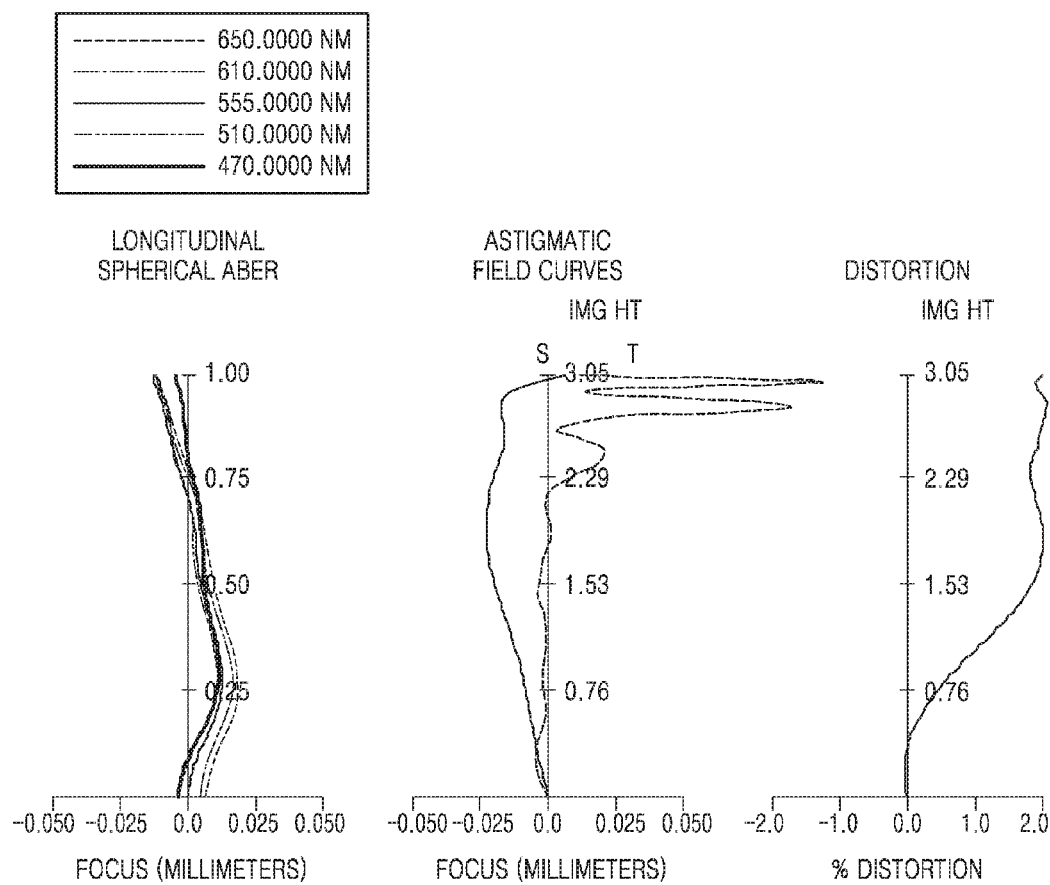
FIG. 4 illustrates a longitudinal spherical aberration, astigmatic field curves, and distortion of the photographic lens according to the embodiment of FIG. 3.

FIG. 4 illustrates a longitudinal spherical aberration, astigmatic field curves, and distortion of the photographic lens 2000 according to Embodiment 2.

<Embodiment 3>

Figure 5:
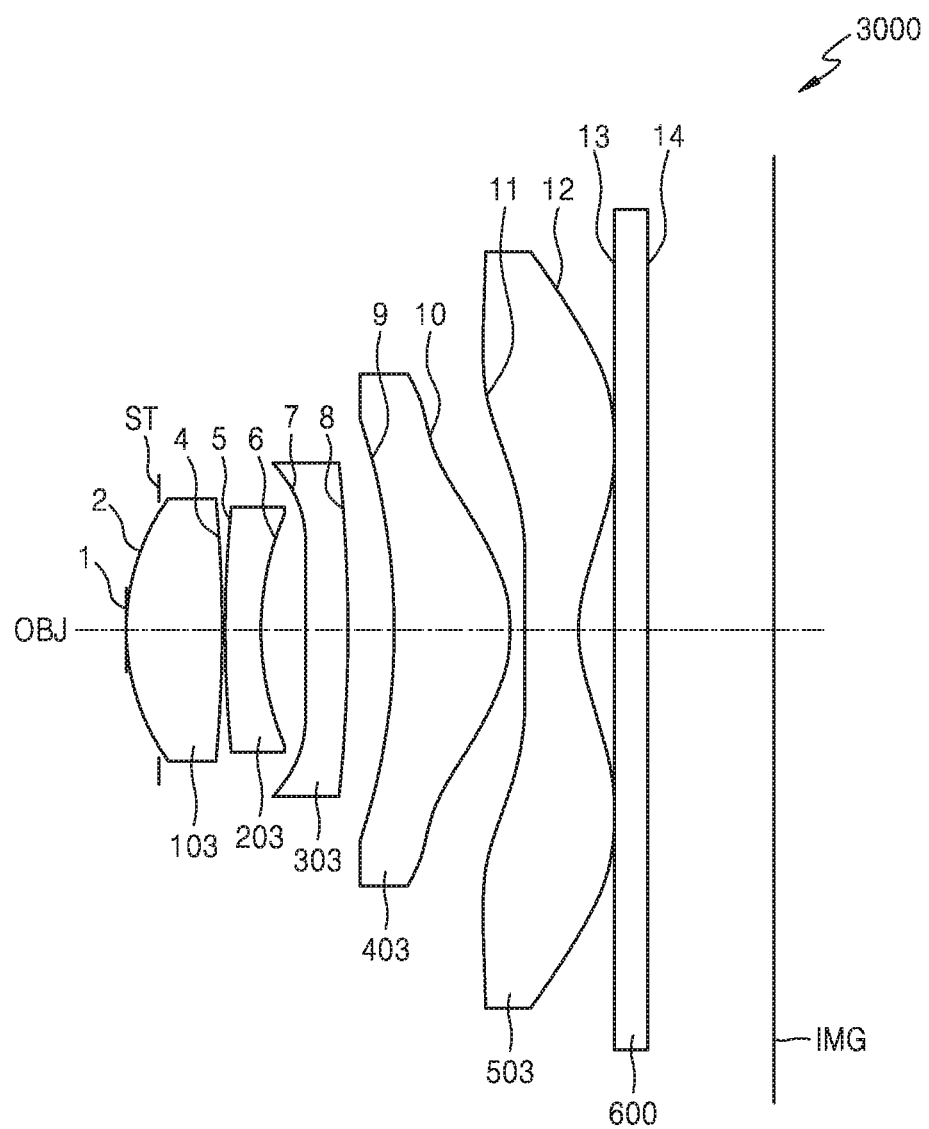
FIG. 5 is a cross-sectional view illustrating an optical arrangement of a photographic lens according to another embodiment.

FIG. 5 illustrates an optical arrangement of a photographic lens 3000 according to Embodiment 3.

Referring to FIG. 5, the photographic lens 3000 includes a first lens 103 having positive refractive power, a second lens 203 having negative refractive power, a third lens 303 having positive refractive power, a fourth lens 403 having positive refractive power, and a fifth lens 503 having negative refractive power, which are sequentially arranged in a direction from the object OBJ to the image plane IMG.

Lens data according to Embodiment 3 is as follows.

TABLE 5

FNo. = 2.09/f = 3.45 mm

| Surface | R | T | Nd | Vd |
|---|---|---|---|---|
| 1 | Infinity | 0.2 | | |
| ST | Infinity | −0.2 | | |
| 3* | 1.3428 | 0.6011 | 1.546 | 56.093 |
| 4* | −91.6234 | 0.03 | | |
| 5* | 14.3967 | 0.23 | 1.656 | 21.465 |
| 6* | 2.3329 | 0.2878 | | |
| 7* | 10.3232 | 0.2769 | 1.645 | 23.518 |
| 8* | 12.1625 | 0.2946 | | |
| 9* | −3.0533 | 0.7496 | 1.546 | 56.093 |
| 10* | −0.7067 | 0.0965 | | |
| 11* | −93.6421 | 0.3435 | 1.546 | 56.093 |
| 12* | 0.7712 | 0.23 | | |
| 13 | Infinity | 0.21 | | |
| 14 | Infinity | 0.8196 | | |
| IMG | Infinity | 0.0004 | | |

Table 6 below shows an aspherical coefficient.

TABLE 6

| Surface | K | A | B | C | D |
|---|---|---|---|---|---|
| 3 | −0.1812 | −0.0225 | 0.3504 | −2.5334 | 10.0997 |
| 4 | 0 | −0.1814 | 1.1035 | −4.1571 | 10.4912 |
| 5 | 0 | −0.1818 | 1.1414 | −1.7573 | −8.6185 |
| 6 | 4.2487 | −0.0958 | 0.6204 | −2.4281 | 10.4555 |
| 7 | 0 | −0.2076 | 0.2619 | −2.4761 | 13.4549 |
| 8 | 0 | −0.1116 | −0.0142 | 0.1908 | −1.6029 |
| 9 | −16.6517 | −0.0493 | 0.1893 | −0.6945 | 1.5076 |
| 10 | −4.145 | −0.1246 | 0.1666 | −0.1484 | −0.0196 |
| 11 | 0 | −0.1183 | 0.0479 | −0.0621 | 0.0723 |
| 12 | −7.1745 | −0.1535 | 0.129 | −0.0992 | 0.0534 |

Figure 6:
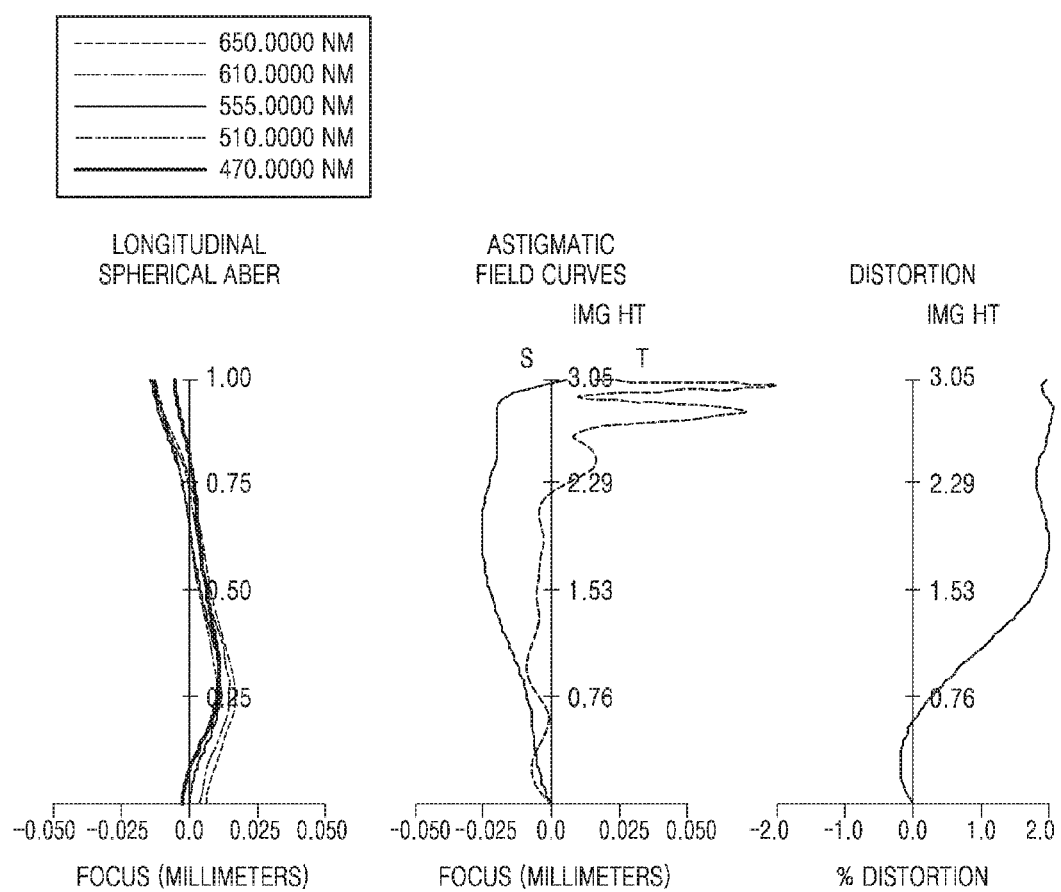
FIG. 6 illustrates a longitudinal spherical aberration, astigmatic field curves, and distortion of the photographic lens according to the embodiment of FIG. 5.

FIG. 6 illustrates a longitudinal spherical aberration, astigmatic field curves, and distortion of the photographic lens 3000 according to Embodiment 3.

Table 7 below shows that the photographic lenses 1000-3000 according to Embodiments 1-3 meet Conditions (1), (2), (3), and (4).

TABLE 7

| Classification | | Embodiment 1 | Embodiment 2 | Embodiment 3 |
|---|---|---|---|---|
| Condition (1) | FOV | 77.04 | 81.2 | 81.84 |
| Condition (2) | TTL | 4.45 | 4.2 | 4.2 |
| | imgH | 3.05 | 3.05 | 3.05 |
| | TTL/imgH | 1.46 | 1.38 | 1.38 |
| Condition (3) | f | 3.75 | 3.49 | 3.45 |
| | BFL | 1.28 | 1.23 | 1.26 |
| | BFL/f | 0.34 | 0.35 | 0.37 |
| Condition (4) | Ind2 | 1.64 | 1.66 | 1.66 |
| | Ind3 | 1.64 | 1.66 | 1.64 |
| | (Ind2 + Ind3)/2 | 1.64 | 1.66 | 1.65 |

The above-described embodiments provide photographic lenses having compact and light structures and achieving smooth aberration correction and a super wide angle.

Each of the photographic lenses facilitates aberration correction by using five lenses, and has a compact and light structure.

Each of the photographic lenses includes an aspherical lens formed of a plastic material, and thus produces a cost-effective and high-performance optical system.

The photographic lenses may be compact and also accomplish a wide angle.

Photographic lenses according to embodiments may be applied to various types of photographic apparatuses, together with image sensors which convert optical images formed via the photographic lenses into electrical signals. The photographic apparatuses may be employed in various electronic apparatuses, for example, mobile terminals, door phones, and cars.

It should be understood that the exemplary embodiments described therein should be considered in a descriptive sense only and not for purposes of limitation. Descriptions of features or aspects within each embodiment should typically be considered as available for other similar features or aspects in other embodiments.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. A photographic lens comprising, in a sequence from an object to an image plane:
   a first lens having positive refractive power;
   a second lens having negative refractive power;
   a third lens having positive refractive power;
   a fourth lens having positive refractive power; and
   a fifth lens having negative refractive power,
   where the photographic lens satisfies the following condition:

$75°<FOV<85°$ where FOV is a field of view of the photographic lens, wherein the photographic lens further satisfies the following condition:

$1.0<TTL/imgH<2.0$ where TTL is a distance on an optical axis from an entrance surface of the first lens to the image plane, and imgH is an image height, and wherein the photographic lens satisfies the following condition:

$$1.6<(Ind2+Ind3)/2<1.7$$

where Ind2 is a refractive index of the second lens and Ind3 is a refractive index of the third lens.

2. The photographic lens of claim 1, wherein the photographic lens further satisfies the following condition:

$$0.2<BFL/f<0.5$$

where BFL is a distance on an optical axis from an exit surface of the fifth lens to the image plane, and f is a focal length of the photographic lens.

3. The photographic lens of claim 1, wherein an entrance surface of the first lens is convex toward the object.

4. The photographic lens of claim 1, wherein an exit surface of the second lens is concave toward the image plane.

5. The photographic lens of claim 1, wherein the third lens has a meniscus shape.

6. The photographic lens of claim 1, wherein an exit surface of the fourth lens is convex toward the image plane.

7. The photographic lens of claim 1, wherein an exit surface of the fifth lens is an aspherical surface having at least one inflection point.

8. The photographic lens of claim 1, wherein all of the first lens through the fifth lens are aspherical plastic lenses.

9. A photographic apparatus comprising the photographic lens of claim 1; and an image sensor configured to convert an optical image formed by the photographic lens into an electrical signal.

10. A photographic lens comprising, in a sequence from an object to an image plane:

a first lens having positive refractive power;
a second lens having negative refractive power;
a third lens having positive refractive power;
a fourth lens having positive refractive power; and
a fifth lens having negative refractive power,
wherein the photographic lens satisfies the following condition:

$$70°<FOV<90°$$

$$0.2<BFL/f<0.5$$

$$1.6<Ind2<1.7$$

$$1.6<Ind3<1.7$$

where FOV is a field of view of the photographic lens, BFL is a distance on an optical axis from an exit surface of the fifth lens to the image plane, f is a focal length of the photographic lens, Ind2 is a refractive index of the second lens, and Ind3 is a refractive index of the third lens.

* * * * *